R. E. HELLMUND.
PHASE CONVERTING SYSTEM.
APPLICATION FILED JAN. 23, 1915.
1,296,287.
Patented Mar. 4, 1919.
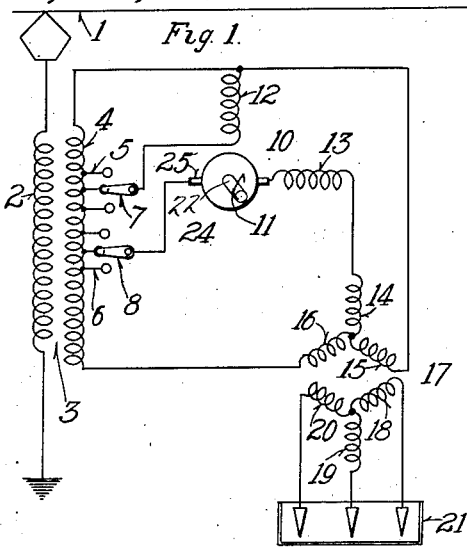
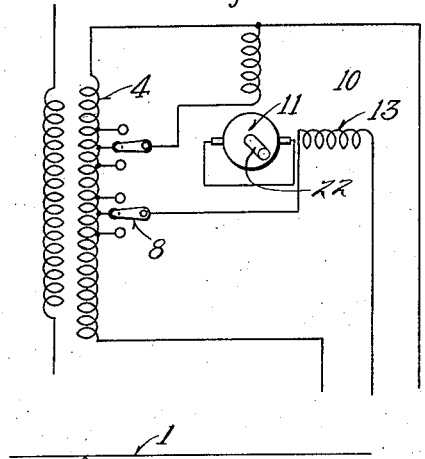
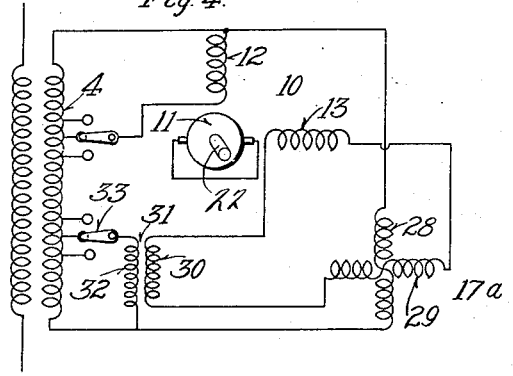
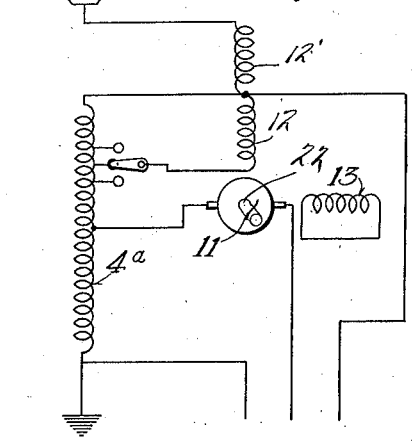
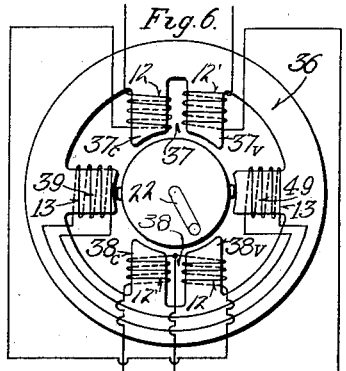
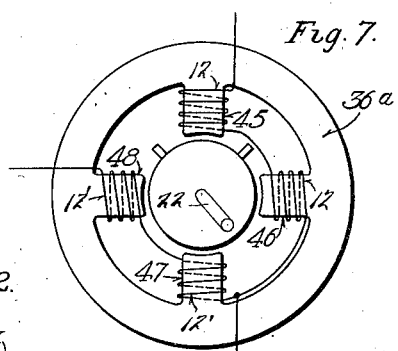
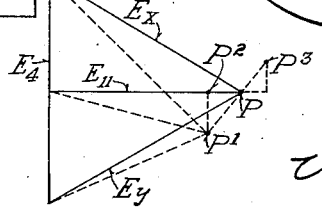
WITNESSES:
S. L. Armstrong
D. H. Mace
INVENTOR
Rudolf E. Hellmund.
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

PHASE-CONVERTING SYSTEM.

1,296,287.              Specification of Letters Patent.         Patented Mar. 4, 1919.

Application filed January 23, 1915. Serial No. 3,917.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Phase - Converting Systems, of which the following is a specification.

My invention relates to systems of alternating-current distribution and to control systems for alternating-current motors, and it has special reference to the control of railway polyphase induction motors that are adapted to receive energy from a single-phase source of distribution.

One of the objects of my invention is to provide a distributing and control system of the above indicated class which shall embody an alternating-current dynamo-electric machine of the commutator type that is arranged and connected in such manner as to serve as a phase converter by means of which the single-phase energy of the source is converted into polyphase energy for the operation of the polyphase induction motor.

It is another object of my invention to utilize an alternating - current commutator converter for the purpose specified and to make simple and effective provisions for adjusting the circuit connections of the converter, whereby compensations for phase distortions and voltage reductions of the converter voltage may be readily accomplished.

In another aspect, it is an object of my invention to provide an alternating-current commutator machine having a plurality of distinct main exciting field windings, one of which is a shunt winding and is energized from a constant source and the other of which is a series winding and is influenced in proportion to the main current which traverses it, whereby an alternating-current commutator machine having substantially compound electrical characteristics is obtained. Moreover, I propose to employ a dynamo-electric machine of this type as a phase converter in the manner already referred to and to thus secure an automatic compensation of the converter phase distortion in accordance with variations in the load conditions.

In a co-pending application, Serial No. 808714, filed December 26, 1913, by Benjamin G. Lamme and assigned to the Westinghouse Electric & Manufacturing Company, a system of distribution and control is disclosed which is adapted to supply polyphase energy to the driving motors from a single-phase source through the agency of a phase converter of the induction type. Provisions are also made for making adjustments of the converter connections for effecting the desired compensations for load conditions.

When an induction phase converter is employed, however, and correcting voltage adjustments are made, it is necessary to switch the full-load current of the converter under all conditions, which, of course, is an undesirable feature and may be avoided at least partially through the use of a converter of the commutator type in which adjustments of the exciting winding involve merely the switching of a relatively small exciting current.

Moreover, in order to secure the benefits of automatic regulation by means of a compound type of alternating-current commutator machine, I find it necessary to place the respective shunt and series windings thereof upon independent polar projections in order to obviate mutual induction between the windings which would otherwise render the series winding useless.

These and other objects are sought by the peculiar arrangement and circuit connections of my invention, and, although I shall illustrate it in connection with a few simple arrangements of circuits, it should be understood that it is not so restricted, but is capable of wide and various applications.

In the accompanying drawing, Figure 1 is a diagrammatic view of a system of distribution and control embodying my invention; Fig. 2 is a vector diagram showing the relationship of certain of the voltages of the system; Figs. 3, 4 and 5 are digrammatic views of modifications of my invention; and Figs. 6 and 7 are diagrammatic views of the circuit connections of two forms of compound commutator machines such as are adapted for use in the system shown in system 5.

Referring to Fig. 1, a supply conductor 1, such as a trolley conductor of a railway system, delivers single - phase energy to a primary winding 2 of a transformer 3 which is provided with a secondary winding 4 having a plurality of sets of taps 5 and 6 to 110 which connections may be made by means of adjustable switching devices 7 and 8.

A phase converter 10 of the single-phase commutator type embodying an armature 11, a main exciting winding 12 and an auxiliary compensating winding 13, is connected to the transformer secondary winding 4 and serves, in conjunction therewith, to supply polyphase energy to primary windings 14, 15 and 16 of a three-phase induction motor 17 having secondary windings 18, 19 and 20 that are connected to an adjustable resistance device 21 that may conveniently take the form of a liquid rheostat.

The commutator phase converter 10 may be of a construction similar to that of an ordinary single-phase commutator motor, having its main exciting winding 12 disposed in substantial quadrature relation with its secondary compensating winding 13. The exciting winding 12 is connected across a portion of the transformer secondary winding 4 by means of a switching device 7. The excitation thereof, therefore, is in phase with the source of energy and may be varied, as desired, by shifting the connections to the various taps 5. The armature 11 embodies suitable windings (not shown) which are connected to a commutator 24 which is provided with a set of brushes 25 in the usual manner. One of the brushes 25 is connected to substantially the mid point of the transformer secondary winding 4 by means of the switching device 8 and said connection may be shifted to the one or the other side thereof by suitable adjustments of said device. The compensating winding 13 is connected in series with the armature 11, and the machine is so designed that the armature is adapted to deliver a quadrature voltage of substantially 86.6% of that of the transformer winding 4. The machine 12 may be driven by any suitable means, such as a car-axle 22, in a manner similar to that disclosed, for example, in U. S. Patent No. 977,784, issued to the Westinghouse Electric & Manufacturing Company on Dec. 6, 1910, on an application filed by William Cooper.

It is evident, therefore, that the voltage of the armature 11 may be combined with that of the transformer winding 4 in such manner as to produce balanced three-phase voltages by connecting brush 25 of the armature 11 to the mid point tap 6. The connections just referred to are thus similar to those of the well-known "Scott" or "T" system and will be readily understood.

A consideration of Fig. 2 will show the relationship of the electromotive forces above mentioned, $E_4$ being the electromotive force of the transformer winding 4 and in phase with the source of energy, and $E_{11}$ being the electromotive force of the armature 11 of the phase converter 10 and which is at 90° from the voltage $E_4$. With this relationship and the voltage $E_{11}$ equal to substantially 86.6% of the voltage $E_4$, it is clear that the electromotive forces $E_4$, $E_x$ and $E_y$ are equal and disposed at 120° from each other. Thus, three-phase energy of balanced electromotive forces is produced from a single-phase source.

Assuming the phase converter to be in operation and the connections to be as shown in Fig. 1, the operation of the system is as follows: Electrolyte is first admitted into the rheostat 21, whereby the motor secondary resistance is correspondingly reduced, thus permitting the motor 17 to be gradually brought up to speed in accordance with well known principles.

Under light or no-load conditions upon the motor 17, the balanced voltage relationship is maintained. However, as the motor load is increased, there is a tendency for the electromotive force delivered by the armature 11 of the converter to be displaced somewhat in phase position and also to be reduced in amount by reason of the impedance of the apparatus. Any phase displacement, of course, disturbs the initial balanced condition of the three-phase voltages and is therefore undesirable. It is, therefore, necessary to provide means for compensating for any voltage reduction and phase displacement during varying load conditions and this is accomplished by means of the switching devices 7 and 8.

Reference may again be had to Fig. 2, and, for purposes of explanation, it will be assumed that, by reason of load conditions, the point P of the diagram is moved to P', which position depends upon the phase distortion and voltage reduction of the electromotive force of the armature 11 of the converter.

The phase distortion may be compensated for by causing the switching device 8 to connect one terminal of the armature to the proper intermediate tap 6 at one side of the mid-point of the winding 4. This adjustment of connections effects the desired result with respect to the phase distortion during motor operation. If, however, the motor 17 should be driven as a generator for delivering energy back to the line, the adjustment of connections must be made to the opposite side of the mid-point.

Having compensated for the phase displacement, thus bringing the point P' to a position $P^2$, it is further necessary to raise the voltage of the armature 11 to its initial value to secure balanced electromotive forces. This voltage adjustment may be effected by increasing the excitation of the main exciting winding 12 of the converter 10 through the switching device 7, and, during this operation, it is necessary to handle comparatively small exciting currents only.

Thus, it is seen that, by proper adjustments of the circuit connections, balanced electromotive forces upon the three-phase motor 17 may be secured throughout the operation.

In case the motor 17 is employed as a generator for regeneration to the line, the point P may be assumed to occupy a position P³ under load conditions when the phase distortion and voltage variation is uncompensated. Normal balanced conditions of regeneration may, of course, be secured in a manner analogous to that already explained, and no description thereof is deemed necessary.

Referring now to Fig. 3, the modification shown differs from that already described chiefly in that the armature 11 of the converter 10 is short-circuited upon itself, and the auxiliary compensating field winding 13, instead of being connected in series circuit with the armature 11, is independently connected to substantially the midpoint of the transformer winding 4 by means of the switching device 8. Although the arrangement of circuits of this system is modified in some respects, the general operation thereof is essentially the same as that of the system of Fig. 1, and similar adjustments and compensations may be effected.

In Fig. 4, I have illustrated a modified system that is adapted to deliver energy to the primary windings 28 and 29 of a two-phase induction motor 17ª. The converter 10 has its armature 11 short-circuited upon itself, while its exciting winding 12 is connected across a portion of the transformer winding 4, as already explained. The auxiliary compensating winding 13, however, is connected in series circuit with the motor primary winding 29 and with a secondary winding 30 of an auxiliary transformer 31 having its primary winding 32 connected across a portion of the main transformer winding 4 by means of a switching device 33. The motor primary winding 28 is connected directly across the main transformer winding 4, and the converter 10 is so designed that the generated quadrature voltage of the winding 13 is equal to that of the source, whereby balanced voltages are supplied to the two-phase induction motor 17ª, at least, under light or no-load conditions.

When the motor 17ª is loaded, the tendency for phase distortion is compensated for through the action of the auxiliary transformer 31 which serves to introduce into the circuit of the converter winding 13 and motor winding 29, a voltage which is in phase with the source of energy and effects a resultant shifting of the phase position of the voltage delivered to the motor. Moreover, this additional out-of-phase voltage varies in accordance with variations in load, to a certain extent, dependent upon the "regulation" of the transformers 3 and 31, as will be understood, whereby partially automatic regulation of the phase distortion is obtained. Further and more exact adjustments may be effected by suitable manipulation of the switching device 33.

Obviously, similar automatic regulation may be accomplished by the use of a suitable auxiliary transformer in connection with systems of the general class shown in Figs. 1 and 3, or, in fact, in many other modified systems.

Reference may now be had to Fig. 5 which discloses a modified system adapted to provide polyphase energy for three-phase apparatus through the agency of a commutator type phase converter having windings and circuit connections that are peculiarly adapted to effect automatic regulation of the phase position of the converter voltage in accordance with variations in the load upon the driving motor.

In this case, the armature 11 has one of its terminals connected to the mid-point of an auto-transformer winding 4ª and the auxiliary compensating field winding 13 is short-circuited upon itself. The main exciting field winding comprises two parts, a field winding 12 which corresponds, in all respects, to the winding 12 hereinbefore described and which constitutes a shunt winding that receives a constant excitation from a portion of the transformer winding 4ª, and a winding 12′ which constitutes a series winding and is connected in series circuit between the supply conductor 1 and the transformer winding 4ª and, hence, is variably excited in accordance with the load.

In order to secure the benefits of this compounding, or combined series and shunt field winding, it is necessary to prevent any mutual induction between them, and, therefore, the field magnet structure is arranged in the manner shown in Fig. 6. The field magnet structure embodies a plurality of split main polar projections 37 and 38 and intermediate auxiliary polar projections 39 and 40. The split main polar projections 37 and 38 are divided substantially in the middle to provide a pair of separate polar members 37′, 37″ and 38′ and 38″. The series field magnet winding 12′ is divided into two sections which are connected in series and respectively disposed upon the polar members 37″ and 38″, while the shunt field winding 12 is similarly divided into sections which are disposed upon the polar members 37′ and 38′ and connected in series-circuit relation. The compensating winding 13 is associated with the auxiliary polar projections 39 and 40, being also divided into two parts that are short-circuited, the one upon the other.

An alternating-current commutator machine having compound characteristics is thus provided which is analogous, so far as its operation is concerned, to the well-known type of direct-current compound wound machines and is well adapted to function as a phase converter to automatically regulate the phase position of its generated voltage in accordance with load conditions.

It should be understood, however, that this form of compound-wound alternating-current dynamo - electric machine is not restricted, in any sense, to use as a phase converter in a system such as described but is capable of application, either as a motor or as a generator, in many other classes of systems.

In Fig. 7 is shown a modified machine of the character referred to which embodies a four-pole field magnet arrangement and a two-circuit series armature. The field magnet structure 36ª comprises a plurality of main polar projections 45, 46, 47 and 48, and the shunt winding 12 has its respective sections associated with the polar projections 45 and 46 while the projections 47 and 48 carry the sections of the variable series winding 12'.

Other modifications in the structural details and circuit connections of my improved form of commutator phase converter and also of the arrangement of parts, circuits and mode of operation of the system of distribution and control, as a whole, may be effected without departing from the spirit and scope of my invention, and I desire that only such limitations shall be imposed as are indicated in the appended claims.

I claim as my invention:

1. The combination with a source of single-phase energy, and a transformer receiving energy therefrom, of a single-phase commutator dynamo-electric machine comprising a main shunt field winding connected across a portion of said transformer, a series field winding connected in series circuit with said transformer, driving means therefor, and an armature connected in an independent circuit to said transformer.

2. The combination with a source of single-phase energy, and a transformer receiving energy therefrom, of a single-phase commutator dynamo-electric machine comprising an armature having one terminal connected to an intermediate point in said transformer, a main field winding excited in phase with said transformer across a portion thereof, other means for varying the excitation of said machine in accordance with load conditions, driving means therefor, and a polyphase electric motor receiving energy from said transformer and said dynamo-electric machine.

3. The combination with a single-phase source of energy, a transformer connected thereto and a polyphase electric motor, of a single-phase commutator converter provided with driving means for supplementing said single-phase energy to supply polyphase energy for said motor and comprising a plurality of exciting field windings respectively connected across a portion of said transformer and in series therewith, whereby the phase distortion of said converter, under load conditions, is automatically corrected.

4. The combination with a single-phase source of energy, a transformer connected thereto and a polyphase electric motor, of a single-phase commutator converter provided with driving means for supplementing said single-phase energy to supply polyphase energy for said motor and comprising an armature and a two-part exciting field winding, one part being constantly excited from said transformer and the other part being excited in accordance with changes in load upon said electric motor.

5. The combination with a source of single-phase energy, and polyphase electric means receiving energy therefrom, of means interposed between said source and said polyphase means for supplying single-phase energy of displaced phase and embodying a single-phase commutator dynamo-electric machine having a substantially constantly excited field winding and another field winding excited in accordance with variations of the load upon said polyphase means, whereby compensations for phase distortions in said converting means are automatically effected.

In testimony whereof, I have hereunto subscribed my name this 21st day of Jan., 1915.

RUDOLF E. HELLMUND.

Witnesses:
J. V. Dobson,
B. B. Hines.